(12) United States Patent
Youn et al.

(10) Patent No.: US 7,873,167 B2
(45) Date of Patent: Jan. 18, 2011

(54) SYSTEM AND METHOD FOR EFFECTIVELY PRE-DISTRIBUTING KEY FOR DISTRIBUTED SENSOR NETWORK

(75) Inventors: Hee-yong Youn, Seongnam-si (KR); Sung-jin Choi, Goyang-si (KR)

(73) Assignee: Sungkyunkwan University Foundation for Corporate Collaboration, Suwon-si (KR)

( * ) Notice: Subject to any disclaimer, the term of this patent is extended or adjusted under 35 U.S.C. 154(b) by 901 days.

(21) Appl. No.: 11/566,411

(22) Filed: Dec. 4, 2006

(65) Prior Publication Data

US 2010/0061557 A1    Mar. 11, 2010

(30) Foreign Application Priority Data

Dec. 29, 2005 (KR) .................. 10-2005-0133711
May 15, 2006 (KR) .................. 10-2006-0043219

(51) Int. Cl.
*H04L 9/00* (2006.01)

(52) U.S. Cl. .................. 380/277; 380/278; 380/44; 380/45

(58) Field of Classification Search .......... 380/277–280, 380/44–45
See application file for complete search history.

(56) References Cited

U.S. PATENT DOCUMENTS

| | | | |
|---|---|---|---|
| 7,486,795 B2* | 2/2009 | Eschenauer et al. | 380/277 |
| 2005/0071578 A1* | 3/2005 | Day et al. | 711/153 |

FOREIGN PATENT DOCUMENTS

| | | |
|---|---|---|
| KR | 10-0525867 | 10/2005 |
| KR | 10-0542652 | 1/2006 |

OTHER PUBLICATIONS

Price (Alan Price, Kristie Kosaka, Samir Chatterjee, "A Secure Key Management Scheme for Sensor Networks", Proceedings of the Tenth Americas Conferences on Information Systems, New York, New York, Aug. 2004).*
Du (Wenliang Du, Jing Deng, Yungsiang Han, Pramod Varshney, "A Pairwise Key Pre-distribution Scheme for Wireles Sensor Networks", CCS '03, Oct. 27-30, 2003).*
Tomoya Enokido, et al. "Embedded and Ubiquitous Computing", EUC Workshop5,Proceedings, 2005, 16 pages.

* cited by examiner

*Primary Examiner*—Kambiz Zand
*Assistant Examiner*—Peter Poltorak
(74) *Attorney, Agent, or Firm*—Oblon, Spivak, McClelland, Maier & Neustadt, L.L.P.

(57) ABSTRACT

A system for effectively pre-distributing keys for a distributed sensor network is disclosed, The system includes: a plurality of sensor nodes, each of which has a sensing function, a calculation function, and a wireless communication function; and a base station which is connected to the sensor nodes over a wireless network, receives data from the sensor nodes, acts as a data central station, and distributes keys for inter-sensor-node security authentication to the sensor nodes. A key management unit contained in the base station, generates a set of the sensor nodes used for security authentication between the sensor nodes, decomposes the set of the sensor nodes into a plurality of matrices, distributes the matrices to the sensor nodes, and allows the sensor nodes to search for a common private key required for the security authentication using the received matrices. Therefore, the system can always search for a common private key between the sensor nodes.

6 Claims, 5 Drawing Sheets

(a) key pool (b) key pool in symmetric matrix

|  | Node_x | Node_y |
|---|---|---|
| After Key pre-distribution | $L_{r\_3}$ (-1, -6/7, 1)<br>$U_{c\_3}$ (-2, 6, 29/7) | $L_{r\_2}$ (2, 1, 0)<br>$U_{c\_2}$ (4, -7, 0) |
| After column-exchange | $L_{r\_3}$ (-1, -6/7, 1)<br>$U_{c\_2}$ (4, -7, 0) | $L_{r\_2}$ (2, 1, 0)<br>$U_{c\_3}$ (-2, 6, 29/7) |
| After Key calculation | $L_{r\_3} \times U_{c\_2} = 2$<br>$(=K_{32})$ | $L_{r\_2} \times U_{c\_3} = 2$<br>$(=K_{23})$ |

SYSTEM AND METHOD FOR EFFECTIVELY PRE-DISTRIBUTING KEY FOR DISTRIBUTED SENSOR NETWORK

BACKGROUND OF THE INVENTION

1. Field of the Invention

The present invention relates to a security technology for a sensor network, and more particularly to a system and method for effectively pre-distributing keys, which allocate keys to sensor nodes of a distributed sensor network using not only a key pool (i.e., The Pool of Keys) configured in the form of a symmetric matrix but also an LU decomposition, and search for a common private key during the communication between the sensor nodes.

2. Description of the Related Art

Typically, a sensor network is used as a base network for implementing Ubiquitous Computing technology, and acts as a wireless network composed of several super-lightweight and low-power sensors. Many developers are conducting intensive research into the Ubiquitous Computing technology and associated application fields, such that a sensor network capable of substantially providing a user with Ubiquitous environments is being intensively discussed as the principal issue. The sensor network includes a large number of sensor nodes, such that it detects desired information using sensors and processes detected information.

However, the above-mentioned sensor network can acquire or process more various information using the sensors, and can guarantee not only integrity of a large amount of detected information but also user's privacy. In other words, in order to implement more realistic- and fluent-Ubiquitous Computing environments, application usages of the sensor network, the development of sensor technology, and sensor-network security mechanism capable of safely processing/managing detected information must be newly developed and be applied to the above-mentioned Ubiquitous Computing environments.

The sensor network has been widely used for a technical field having limited arrangement. A variety of technical fields have been widely used, for example, a real-time traffic monitoring field, a building security monitoring field (i.e., construction, fire, and physical security monitoring, etc.), a military sensing/detecting field, an earthquake activity measurement field, a real-time pollution monitoring field, a wildlife monitoring field, and a wildfire detection field, etc.

A variety of applications contained in the sensor network are dependent on safe functions of the sensor network. If the sensor network is in danger or fails to communicate with another party, a serious or critical situation may occur. If the sensor network is located under inappropriate environments or is in danger from hacking or malicious attack, the sensor network becomes of vital importance to security. In other words, if an unexpected problem occurs in the security of the sensor network, an attacker may easily tap the sensor network for information, may imitate the sensor nodes contained in the sensor network, or may intentionally provide other sensor nodes with wrong information. Therefore, a method for guaranteeing communication security between sensor nodes, and a method for establishing a private key between the sensor nodes are of importance.

In order to solve the above-mentioned problems, the conventional art has widely used an asymmetric encryption method. However, the above-mentioned conventional art is inappropriate for the distributed sensor network due to limited-energy power and calculation ability (i.e., a limited number of calculations) of the sensor nodes, such that a random Key Pre-Distribution Scheme is recently proposed to solve the above-mentioned problems. However, the above-mentioned random Key Pre-Distribution Scheme also has a disadvantage in that it cannot guarantee a process for searching for a public key during the communication between two sensor nodes.

In past years, a variety of methods for effectively managing keys have been proposed to implement the security mechanism of the sensor network, however, most methods have used a public key encryption scheme. Typically, the public key encryption scheme requires a large number of calculations, such that it is inappropriate for the sensor node because the sensor node has a battery and small memory capacity.

In order to solve the above-mentioned problem of the public key encryption scheme, a symmetric key encryption scheme has been proposed. The most principal method of the symmetric key encryption scheme is that all the sensor nodes contained in the sensor network use a single key.

However, if the single key is exposed from a single sensor node, all the data of the sensor network may be unavoidably exposed.

This problem may be solved by a Pair-Wise key scheme, however, each sensor node must store (n−1) keys in a memory such that the pair-wise scheme is inappropriate for the sensor node having limited resources. Also, the above-mentioned pair-wise scheme requires n(n−1)/2 keys, resulting in the occurrence of limited extensibility.

In order to solve the above-mentioned problems of the pair-wise scheme, a random key pre-distribution scheme has been proposed by Eschesnauer and Gligo.

The random key pre-distribution scheme creates a large number of random keys at a base station, stores the created random keys in a key pool, and selects a predetermined key set from among the key pool at random, such that the selected key sets are distributed to individual sensor nodes.

For example, it is assumed that a public key between a first key set assigned to the sensor node "A" and a second key set assigned to the sensor node "B" is set to a common private key between the A and B sensor nodes. If there is no public key between the first key set of the A sensor node and the second key set of the B sensor node, a path key is created, such that the created path key is used as a common private key.

The above-mentioned random key pre-distribution scheme is composed of two steps, i.e., an initialization step and a key setup step.

The above-mentioned initialization step is performed before the sensor nodes are arranged, selects a very large-sized key pool from among the space of all the available keys, selects a predetermined number of keys from the selected key pool at random, and stores the selected keys in a key ring of each sensor node. Each of the keys contained in the key pool has a unique identifier (ID). The key and its ID are stored in the key ring of a corresponding sensor node.

The above-mentioned key setup step is performed after the sensor nodes are arranged. A sensor node broadcasts IDs of keys contained in its own key ring. A neighboring sensor node of the above-mentioned sensor node compares the broadcast ID with its own key-ring ID, and determines whether it has the same public key as that of the above-mentioned sensor node. If it is determined that the key ring of the neighboring sensor node has the same public key as that of the above-mentioned sensor node, a session key is established via a challenge/response protocol. If there is no public key in the key ring, a path key is established via the neighboring sensor at which the session key has been established.

A first representative example of the above-mentioned key distribution techniques has been disclosed in Korean Patent Registration No. 10-0525867, entitled "METHOD FOR CONTROLLING SECURITY OF WIRELESS LAN USING DYNAMIC RE-KEYING", issued on Oct. 26, 2005, which is hereby incorporated by reference.

The above-mentioned first key distribution method of the Korean Patent Registration No. 10-0525867 creates a new master security key when a client terminal is initially authenticated and secured, sets the created master security key to a data encryption key, and provides the client terminal with the set master security key acting as the data encryption key, such that a dynamic encryption key distribution is performed, resulting in the reduction of server load. In order to perform the above-mentioned operations, the first key distribution method includes: performing not only initial authentication between the client terminal and an authentication/security server but also a security process between them; creating a new master security key on the basis of the result of the initial authentication and security process between the client terminal and the authentication/security server; and creating a data encryption key for data security from the new master security key, and transmitting the created data encryption key to the client terminal.

A second representative example of the above-mentioned key distribution protocol techniques has been disclosed in Korean Patent Registration No. 10-0542652, entitled "KEY DISTRIBUTION PROTOCOL METHOD FOR WIRELESS COMMUNICATION ENVIRONMENTS", issued on Jan. 4, 2006, which is hereby incorporated by reference.

The above-mentioned first key distribution protocol method of the Korean Patent Registration No. 10-0542562 includes: sharing private information between a user and a server to provide safer- and supplementary-security requirements, such that a registration process is performed; and encrypting a random number created by the user using the private information, authenticating mutual entities using a private key of the user and the random number of the server according to a predetermined session key calculation equation, and at the same time creating the session key.

The above-mentioned conventional key distribution technology such as the first or second key distribution method cannot guarantee a public key between two desired sensor nodes which desire to communicate with each other. In other words, the above-mentioned conventional key distribution technology has a disadvantage in that it cannot search for the public key (also called "common key") between two sensor nodes communicating with each other.

Conventional methods for implementing security of the distributed sensor network have widely used an asymmetric method such as a Deffie-Hellman key agreement or Rivest-Shamir-Adelman (RSA) method. The above-mentioned conventional methods are inappropriate for the distributed sensor network due to the limited-calculations and energy resources of the sensor nodes. In order to solve the above-mentioned problem, the conventional key pre-distribution system has a disadvantage in that it cannot always share a private key required for communication between the sensor nodes.

If a common private key between a first sensor node and a second sensor node acting as a neighboring sensor node of the first sensor node is not stored in a key ring of the first sensor node, the conventional random key pre-distribution method cannot establish a key of a desired path. Therefore, an unexpected overhead for searching for the desired path unavoidably occurs, and intermediate sensor nodes of the path must be fully trusted.

Also, the conventional random key pre-distribution method selects M keys from among the key pool at random. If there is a common private key between two sensor nodes, a neighboring malicious sensor node of the two sensor nodes may easily tap traffic data between the two sensor nodes using the common private key.

SUMMARY OF THE INVENTION

Therefore, the present invention has been made in view of the above problems, and it is an object of the invention to provide a system and method for effectively pre-distributing keys for a distributed sensor network, such that it effectively protects movement- or moving-data of a sensor at low power and a small amount of resources.

It is another object of the present invention to provide a system and method for effectively pre-distributing keys for a distributed sensor network, such that all the pairs of the sensor nodes, each of which has low power and a small amount of resources, can search for a common private key using keys allocated by an LU decomposition method of a symmetric matrix of a key pool.

In accordance with one aspect of the present invention, the above and other objects can be accomplished by the provision of a system for effectively pre-distributing keys for a distributed sensor network including: a plurality of sensor nodes, each of which has a sensing function, a calculation function, and a wireless communication function; and a base station which is connected to the sensor nodes over a wireless network, receives data from the sensor nodes, acts as a data central station, and distributes keys for inter-sensornode security authentication to the sensor nodes, the system comprising: a key management unit contained in the base station, for generating a set of the sensor nodes used for security authentication between the sensor nodes, decomposing the set of the sensor nodes into a plurality of matrices, distributing the matrices to the sensor nodes, and allowing the sensor nodes to search for a common private key required for the security authentication using the received matrices.

Preferably, the key management unit includes: a key pool generator for generating a key pool (i.e., the Pool of Keys) indicating the set of the keys; a key decomposition unit for decomposing the key pool generated by the key pool generator into several matrices; and a key distribution unit for receiving rows and columns from the matrices decomposed by the key decomposition unit at random, and distributing the received rows and columns to the sensor nodes.

Preferably, the key pool is configured in the form of a symmetric matrix.

Preferably, the key decomposition unit decomposes the key pool using an LU decomposition method.

Preferably, the rows are indicative of rows of an L matrix decomposed by the key decomposition unit, and the columns are indicative of columns of a U matrix decomposed by the key decomposition unit.

Preferably, the common private key is searched for by multiplying a row of each sensor node by a column of the sensor node, after columns distributed to two sensor nodes which desire to communicate with each other are exchanged with each other.

Preferably, a first sensor node from among the two sensor nodes has a first common private key ($K_{ij}$) denoted by "$K_{ij}=L_{r\_i} \times U_{c\_j}$", and a second sensor node from among the two sensor nodes has a second common private key ($K_{ji}$) denoted by "$K_{ji}=L_{r\_j} \times U_{c\_i}$", wherein "$L_{r\_i}$" is indicative of a row assigned to the first sensor node, "$U_{c\_j}$" is indicative of a column assigned to the second sensor node, "$L_{r\_j}$" is indicative of a row assigned to the second sensor node, "$U_{c\_i}$" is indicative of a column assigned to the second sensor node.

In accordance with yet another aspect of the present invention, there is provided a method for effectively pre-distributing keys for a distributed sensor network including: a plurality of sensor nodes, each of which has a sensing function, a calculation function, and a wireless communication function; and a base station which is connected to the sensor nodes over a wireless network, receives data from the sensor nodes, acts as a data central station, and has a key management unit for generating keys for inter-sensornode security authentication and distributing the generated keys to the sensor nodes, the method comprising: a) generating, by the key management unit, a key pool (i.e., the Pool of Keys) indicating the set of the keys; b) constructing, by the key management unit, the generated key pool in the form of a symmetric matrix; c) decomposing, by the key management unit, the symmetric matrix into several matrices; and d) receiving, by the key management unit, rows and columns from the matrices, and distributing the received rows and columns to the sensor nodes, whereby a common private key required for the security authentication is searched for by the rows and columns received from the sensor nodes.

Preferably, the constructing step b) includes: constructing the key pool in the form of a symmetric matrix.

Preferably, the decomposing step c) includes: decomposing the key pool using an LU decomposition method.

Preferably, the rows of the step d) are indicative of rows of an L matrix having been decomposed at the step c), and the columns of the step d) are indicative of columns of a U matrix having been decomposed at the step c).

Preferably, the common private key is searched for by multiplying a row of each sensor node by a column of the sensor node, after columns distributed to two sensor nodes which desire to communicate with each other are exchanged with each other.

Preferably, a first sensor node from among the two sensor nodes has a first common private key ($K_{ij}$) denoted by "$K_{ij}=L_{r\_i} \times U_{c\_j}$", and a second sensor node from among the two sensor nodes has a second common private key ($K_{ji}$) denoted by "$K_{ji}=L_{r\_j} \times U_{c\_i}$", wherein "$L_{r\_i}$" is indicative of a row assigned to the first sensor node, "$U_{c\_j}$" is indicative of a column assigned to the second sensor node, "$L_{r\_j}$" is indicative of a row assigned to the second sensor node, "$U_{c\_i}$" is indicative of a column assigned to the second sensor node.

In accordance with another aspect of the present invention, there is provided a computer-readable recording medium for use in a method for effectively pre-distributing keys for a distributed sensor network including: a plurality of sensor nodes, each of which has a sensing function, a calculation function, and a wireless communication function; and a base station which is connected to the sensor nodes over a wireless network, receives data from the sensor nodes, acts as a data central station, and has a key management unit for generating keys for inter-sensornode security authentication and distributing the generated keys to the sensor nodes, comprising: a) generating, by the key management unit, a key pool (i.e., the Pool of Keys) indicating the set of the keys; b) constructing, by the key management unit, the generated key pool in the form of a symmetric matrix; c) decomposing, by the key management unit, the symmetric matrix into several matrices; and d) receiving, by the key management unit, rows and columns from the matrices, and distributing the received rows and columns to the sensor nodes, whereby a common private key required for the security authentication is searched for by the rows and columns received from the sensor nodes.

The present invention provides a new key pre-distribution method for searching for a private key between sensor nodes using a key pool in which all the pairs of the sensor nodes are configured in the form of a symmetric matrix. The present invention relates to the LU decomposition method, and performs mutual authentication between sensor nodes differently from the conventional art. The present invention compares its performance with that of the conventional art to determine which one of the present invention and the convenience requires more keys. Specifically, provided that the memory of each sensor node is made small, it can be easily recognized that the present invention is superior to the conventional art.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
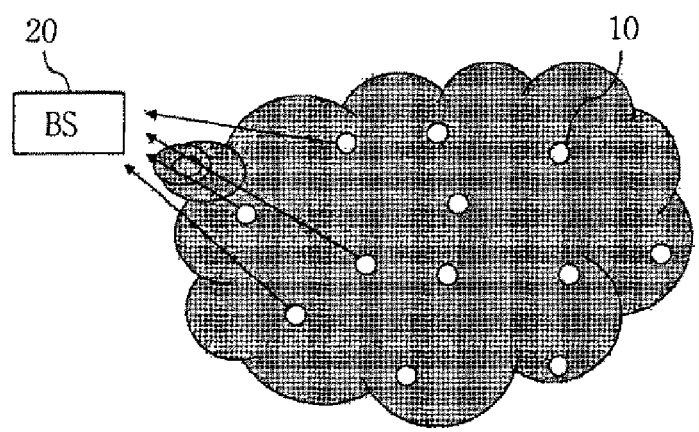
FIG. 1 is a conceptual diagram illustrating a system for effectively pre-distributing keys for a distributed sensor network according to a preferred embodiment of the present invention.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

Characteristics of a matrix for use in the key pre-distribution method according to the present invention will hereinafter be described with reference to the following first and second definitions.

First Definition:

If a square matrix "K" is denoted by $K^T=K$, a transpose matrix of the square matrix "K" is denoted by "$K^T$", and the square matrix "K" is called a symmetric matrix. The symmetric matrix satisfies a specific condition "$K_{ij}=K_{ji}$" in association with all of "i" and "j" values. In this case, "$K_{ij}$" is indicative of an i-th row and j-th column of the square matrix "K".

Second Definition:

If the (M×M) matrix "K" is decomposed into two matrices, this decomposition method is called a "LU decomposition".

In this case, "L" is indicative of an (M×M) Low Triangular matrix, and "U" is indicative of an (M×M) Upper Triangular matrix.

A system for effectively pre-distributing keys for a distributed sensor network according to the present invention will hereinafter be described with reference to FIGS. 1 and 2.

FIG. 1 is a conceptual diagram illustrating a system for effectively pre-distributing keys for a distributed sensor network according to a preferred embodiment of the present invention. FIG. 2 is a block diagram illustrating a base station according to a preferred embodiment of the present invention.

Referring to FIG. 1, the system for effectively pre-distributing keys for a distributed sensor network according to the present invention includes a plurality of sensor nodes 10 and a base station 20. Each of the sensor nodes 10 has a variety of functions, e.g., a sensing function, a calculation function, and a wireless communication function, etc. The base station 20 is connected to the sensor nodes 10 over a wireless network, receives data from the sensor nodes 10, acts as a data central station, and distributes keys for inter-sensornode security authentication to the sensor nodes 10.

Figure 2:
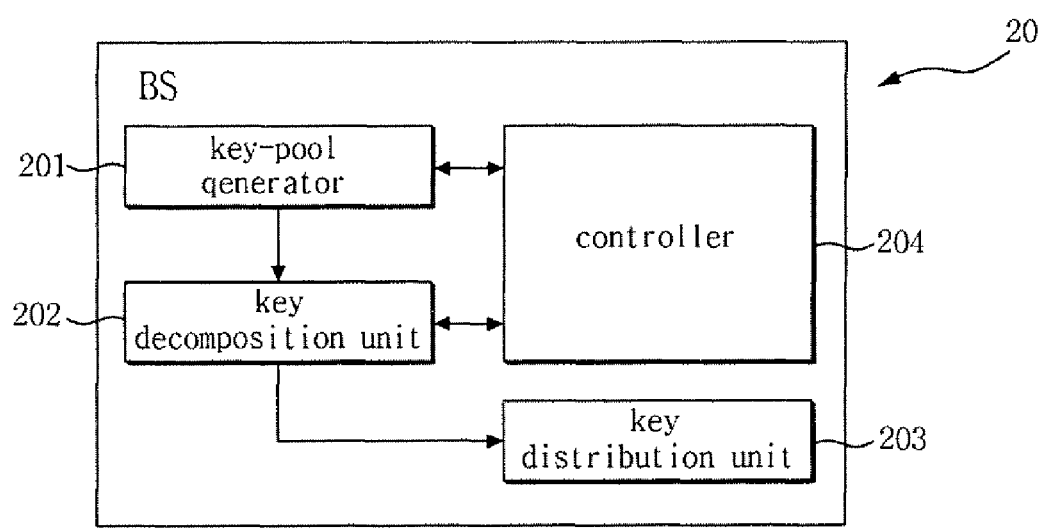
FIG. 2 is a block diagram illustrating a base station according to a preferred embodiment of the present invention.

Referring to FIG. 2, the base station 20 includes a key management unit capable of managing a process for generating keys capable of authenticating security between the sensor nodes 10 and a process for distributing the created keys. The above-mentioned key management unit includes: a key pool generator 201 for generating a key pool indicative of the set of keys; a key decomposition unit 202 for decomposing the key pool generated by the key pool generator 201 into a plurality of matrices; a key distribution unit 203 for receiving rows and columns from the matrices decomposed by the key decomposition unit 202 at random, and distributing the received rows and columns to the sensor nodes 10; and a controller for controlling the key pool generator 201, the key decomposition unit 202, the key distribution unit 203, and the base station 20.

The rows and columns distributed to the sensor nodes 10 by the base station 20 are used to search for a common private key required for security authentication. In other words, the above-mentioned rows and columns are used to search for the common private key required for authenticating security between two sensor nodes 10 which desire to communicate with each other, such that the common private key between the sensor nodes can always be searched for.

The key pool generator 201 configures the key pool in the form of a symmetric matrix. The key decomposition unit 202 decomposes the symmetric matrix into the L matrix and the U matrix using the LU decomposition method.

A method for effectively pre-distributing keys for a distributed sensor network according to the present invention will hereinafter be described with reference to FIGS. 3 to 5.

FIGS. 3A~3B are structural diagrams illustrating key pools according to a preferred embodiment of the present invention. FIG. 4 is a flow chart illustrating a key pre-distribution method according to a preferred embodiment of the present invention.

Figure 3:
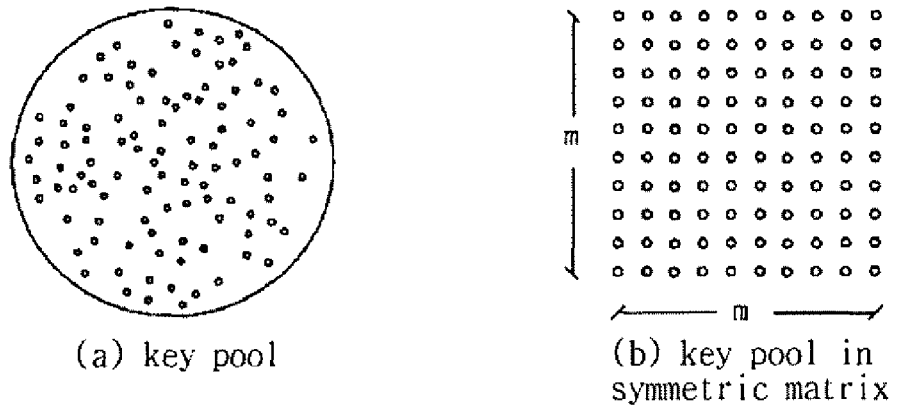
FIGS. 3A~3B are structural diagrams illustrating key pools according to a preferred embodiment of the present invention.
Figure 4:
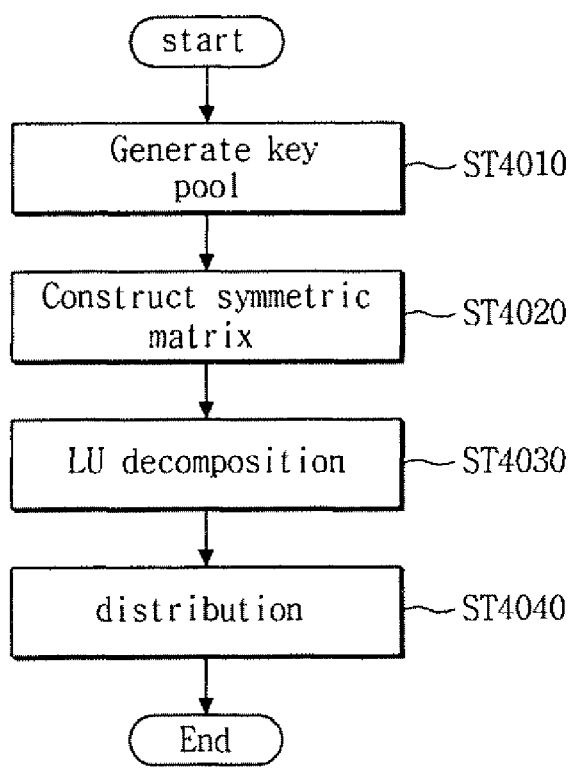
FIG. 4 is a flow chart illustrating a key pre-distribution method according to a preferred embodiment of the present invention.

Referring to FIGS. 3 and 4, the key pre-distribution method according to the present invention includes four off-line steps, i.e., a first step ST4010 for generating a large-sized key pool (e.g., $2^{17}$~$2^{20}$), a second step ST4020 for constructing a symmetric matrix for use of the key pool, a third step ST4030 for performing LU decomposition of the symmetric matrix, and a fourth ST4040 for pre-distributing keys to the sensor nodes 10. Detailed descriptions of the first to fourth off-line steps S4010, ST4020, ST4030, and ST4040 will be as follows.

First Step (ST4010): for Generating a Large-Sized Key Pool (e.g., $2^{17}$~$2^{20}$)

The sensor nodes 10 receive private keys from the large-sized key pool at random before they are arranged. If the private keys are received in two sensor nodes 10, the two sensor nodes 10 search for a single common private key from among the received private keys for communication. Therefore, the key pool generator 201 generates a large-sized key pool (e.g., $2^{17}$~$2^{20}$) at the first step ST4010.

Second Step (ST4020): for Constructing a Symmetric Matrix for Use of a Key Pool

The Eschenauer's random key pre-distribution method uses a large-sized key pool as shown in FIG. 3A. However, the keuy pool generator 201 for the key pre-distribution method according to the present invention constructs a symmetric matrix using the key pool as shown in FIG. 3B.

Third Step (ST4030): for LU Decomposition of the Symmetric Matrix

The key decomposition unit 202 decomposes the symmetric matrix constructed at step ST4020 using the LU decomposition method, such that it can always search for a common private key between the sensor nodes, and can increase the degree of security between the sensor nodes using a mutual authentication function between the sensor nodes 10, Fourth Step (ST4040): for Pre-Distributing Keys to Sensor Nodes The key distribution unit 203 assigns a single row from the L matrix and a single column from the U matrix to each of the sensor nodes 10 at random. In this case, a single requisite condition for the above-mentioned assignment is to assign a row and a column which are located at the same place. In more detail, the $L_{r\_i}$ row (i.e., an i-th row of the L matrix) and the $U_{c\_i}$ column (i.e., an i-th column of the U matrix) are assigned such that they are distributed to the sensor nodes 10. In order to implement communication between two sensor nodes 10, a common private key must be found. A method for searching for the common private key will be as follows.

For the convenience of description and better understanding of the present invention, it is assumed that the sensor node "_x(10)" receives ($L_{r\_i}$, $U_{c\_i}$) and the sensor node "_y (10)" receives ($L_{r\_j}$, $U_{c\_j}$). If a common private key between two sensor nodes "x_(10)" and "y_(10)" must be found to implement safe communication between the sensor node "x_ (10)" and the sensor node "_y(10)", the sensor node "x_(10)" replaces its column with a column of the sensor node "y_(10)", and a vector product is calculated by the following equation 1:

$$\text{sensor node }\_x(10): L_{r\_i} \times U_{c\_j} = K_{ij}$$

$$\text{sensor node }\_y(10): L_{r\_j} \times U_{c\_i} = K_{ji} \quad \text{[Equation 1]}$$

In this case, the matrix "K" is a symmetric matrix, such that the value of $K_{ij}$ is always equal to the value of $K_{ji}$ according to the above-mentioned first definition. Therefore, the value of $K_{ij}$ or $K_{ji}$, is used as a common private key between the sensor node _x(10) and the sensor node "_y(10)". The present invention can always search for the common private key between two sensor nodes 10.

Figures 5, 6:
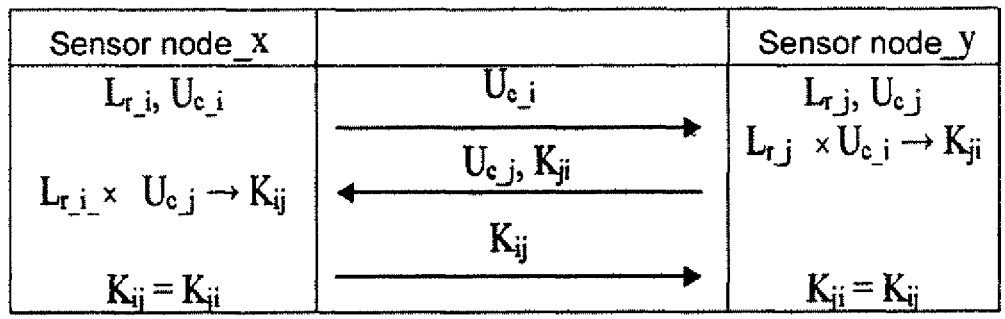
FIG. 5 exemplarily shows a method for effectively pre-distributing keys for a distributed sensor network according to the present invention.
FIG. 6 is a conceptual diagram illustrating mutual authentication between sensor nodes according to a preferred embodiment of the present invention.

FIG. 5 exemplarily shows a method for effectively pre-distributing keys for a distributed sensor network according to the present invention.

First Step

The key pool generator 201 generates a large-sized key pool using a random graph. It is assumed that the generated key pool is "S(−5~5)".

Second Step

The key pool generator 201 selects the values (−2, 1, 2, 4) from the key pool "S", and constructs the symmetric matrix "K" using elements contained in the key pool "S" as denoted by the following equation 2:

$$K = \begin{bmatrix} 2 & 4 & -2 \\ 4 & 1 & 2 \\ -2 & 2 & 1 \end{bmatrix} \quad \text{[Equation 2]}$$

Third Step

The key decomposition unit 202 decomposes the symmetric matrix "K" into the L matrix and the U matrix using the LU decomposition method. Elementary matrices $E_1$, $E_2$, and $E_3$ can be represented by the following equation 3:

$$E_1 = \begin{bmatrix} 1 & 0 & 0 \\ -2 & 1 & 0 \\ 0 & 0 & 1 \end{bmatrix}, E_2 = \begin{bmatrix} 1 & 0 & 0 \\ 0 & 1 & 0 \\ 1 & 0 & 1 \end{bmatrix},$$

$$E_3 = \begin{bmatrix} 1 & 0 & 0 \\ 0 & 1 & 0 \\ 0 & 6/7 & 1 \end{bmatrix} \quad \text{[Equation 3]}$$

The value of L is denoted by $E_3 E_2 E_1 A$, and the value of U is denoted by $E_1^{-1} E_2^{-1} E_3^{-1}$, such that the L matrix and U matrix can be represented by the following equation 4:

$$L = \begin{bmatrix} 1 & 0 & 0 \\ 2 & 1 & 0 \\ -1 & -6/7 & 1 \end{bmatrix}, U = \begin{bmatrix} 2 & 4 & -2 \\ 0 & -7 & 6 \\ 0 & 0 & 29/7 \end{bmatrix} \quad \text{[Equation 4]}$$

It is assumed that the values $L_{r\_3}$ and $U_{c\_3}$ are stored in the first sensor node "_x(10)" and the values $L_{r\_2}$ and $U_{c\_2}$ are stored in the second sensor node "_y(10)". If a common private key between the first sensor node "_x(10)" and the second sensor node "_y(10)" is required to implement safe communication between the sensor nodes "_x(10)" and "_y(10)", a column of the first sensor node "_x(10)" is replaced with that of the second sensor node "_y(10)" as shown in FIG. 5, and a key value is calculated, such that the calculated key value is "2".

Thereafter, in order to perform authentication, the key value of the first sensor node "_x(10)" is compared with that of the second sensor node "_y(10)". In other words, the key value of the first sensor node "_x(10)" is equal to that of the second sensor node "_y(10)", such that mutual authentication between the first sensor node "_x(10)" and the second sensor node "_y(10)" is performed, and the first sensor node "_x(10)" starts to communicate with the second sensor node "_y(10)" using the common private key.

The above-mentioned mutual authentication between the sensor nodes will hereinafter be described with reference to FIG. 6.

FIG. 6 is a conceptual diagram illustrating mutual authentication between sensor nodes according to a preferred embodiment of the present invention.

The present invention provides the mutual authentication between sensor nodes, whereas the conventional random key pre-distribution method does not provide the mutual authentication between sensor nodes.

Referring to FIG. 6, the first sensor node "_x(10)" transmits the value of $U_{c\_i}$ (i.e., an i-th column of the U matrix) to the second sensor node "_y(10)", as represented by:

=>sensor node _x(10)→sensor node _y(10): $\{U_{c\_i}\}$

The second sensor node "_y(10)" receives the value of $U_{c\_i}$ from the first sensor node "_x(10)", multiplies the $U_{c\_i}$ value by the $L_{r\_j}$ value, acquires the $K_{ji}$ value indicative of the multiplied result of the $U_{c\_i}$ and $L_{r\_j}$ values, and transmits the $U_{c\_j}$ and $K_{ji}$ values to the first sensor node "_x(10)", as represented by:

=>sensor node _y(10): $\{L_{r\_j} \times U_{c\_i} \to K_{ji}\}$

=>sensor node _y(10)→sensor node _x(10): $\{U_{c\_i}, K_{ji}\}$

The first sensor node "_x(10)" receives the value of $U_{c\_i}$ from the second sensor node "_y(10)", multiplies the $U_{c\_j}$ value by the $L_{r\_i}$ value, acquires the $K_{ij}$ value indicative of the multiplied result of the $U_{c\_j}$ and $L_{r\_i}$ values, and compares the acquired $K_{ij}$ value with the $K_{ji}$ value received from the second sensor node "_y(10)", as represented by:

=>sensor node _x(10): $\{L_{r\_i} \times U_{c\_j} \to K_{ij}, K_{ij} == K_{ji}\}$ If the first sensor node "_x(10)" satisfies the above-mentioned condition of $K_{ij} == K_{ji}$, it transmits the $K_{ij}$ value to the second sensor node "_y(10)", as represented by:

=>sensor node _x(10)→sensor node _y: $\{K_{ij}\}$

If the value of the second sensor node "_y(10)" is equal to the $K_{ij}$ value of the second sensor node "_y(10)", there is communication between the first and second sensor nodes "_x(10)" and "_y(10)", as represented by:

=>sensor node _y(10): $\{K_{ij} == K_{ji}\}$

The above-mentioned method for effectively pre-distributing keys for a distributed sensor network according to the present invention has the following performances, and a detailed description thereof will hereinafter be described with reference to FIGS. 7 and 8.

Figure 7:
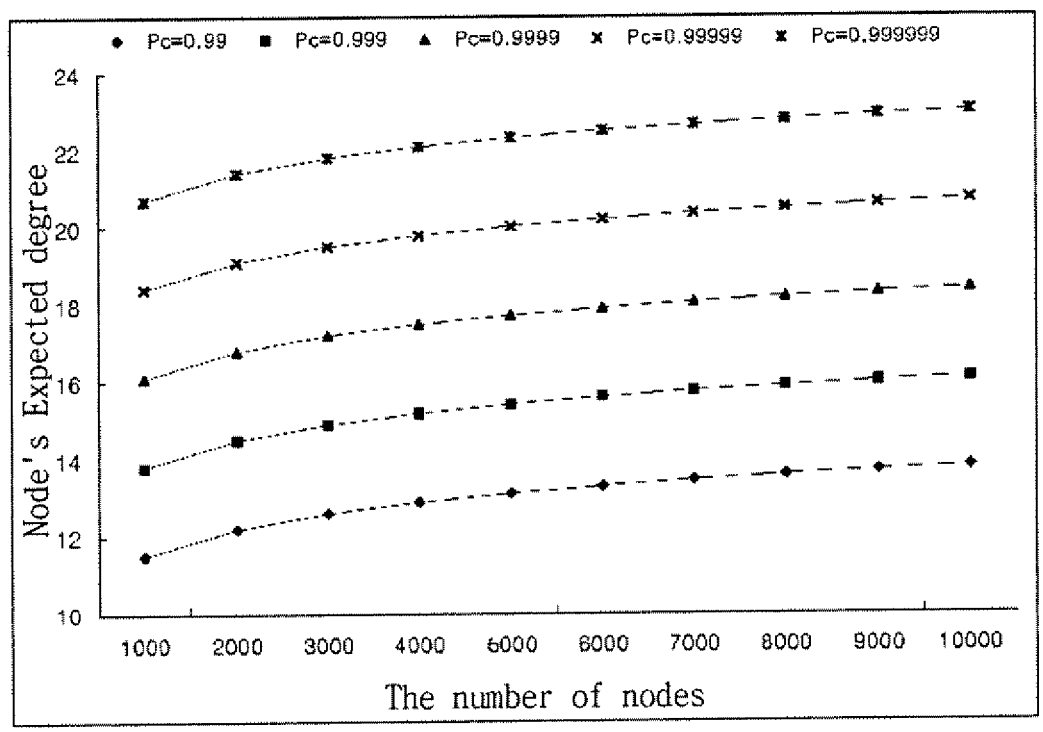
FIG. 7 is a graph illustrating an expected degree depending on a variety of sensor-node numbers according to a preferred embodiment of the present invention.

FIG. 7 is a graph illustrating an expected degree depending on a variety of sensor-node numbers according to a preferred embodiment of the present invention. FIG. 8 is a graph illustrating the result of the comparison between a local connectivity of a conventional method and a local connectivity of the present invention.

In order to verify performances of the present invention, a random graph proposed by Eschenauer and Gligor is used, however, it should be noted that the present invention searches for a private key from all the sensor nodes 10 contained in the network, and provides mutual authentication between the sensor nodes 10.

Figure 8:
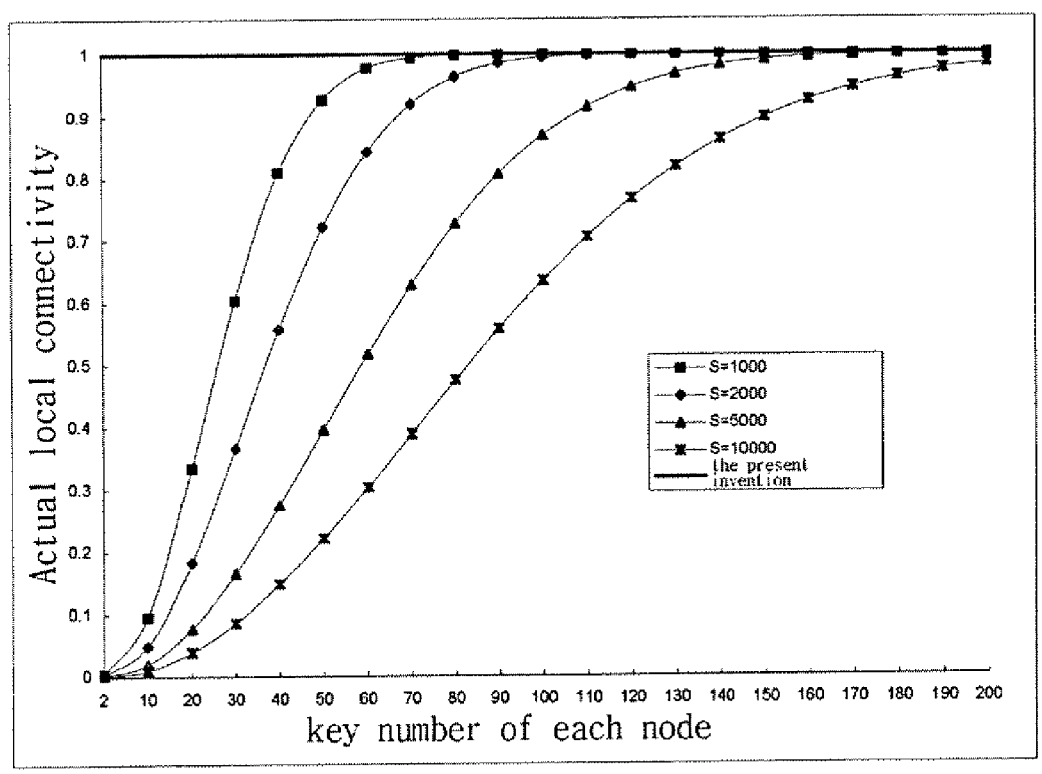
FIG. 8 is a graph illustrating the result of the comparison between a local connectivity of a conventional method and a local connectivity of the present invention.

Referring to FIGS. 7 and 8, the random graph G(n,p) is indicative of a graph of an N sensor-node having the probability "p" of a link existing between two sensor nodes 10. If the "p" value is set to "0", the above-mentioned random graph has no edge. Otherwise, if the "p" value is set to "1", the above-mentioned random graph is perfectly connected, and this perfect connection is called "Certainly True". As well known in the art, Erdos and Renyi have demonstrated the monotone property indicating the presence of the "p" value which moves to a "Nonexistent" mode or a "Certainly True" mode in a very large-sized random graph. In this case, the function for defining the "p" value is referred to as a threshold function of a corresponding attribute. The probability "$P_c$" for the graph connectivity is given, and a threshold function of the "$P_c$" value can be represented by the following equation 5:

$$P_c = \lim_{n \to \infty} P_r[G(n, p) \text{ is connected}] = e^{e^{-c}} \quad \text{[Equation 5]}$$

$$\text{where } p = \frac{\ln(n) - \ln(-\ln(P_c))}{n}$$

In Equation 5, "p" is indicative of the probability of arranging a public key between two sensor nodes 10, "n" is indicative of the number of sensor nodes 10, and "d" is indicative of an expected degree to be calculated by the following equation 6:

$$d = p \times (n-1) = \frac{(n-1)(\ln(n) - \ln(-\ln(P_c)))}{n} \quad \text{[Equation 6]}$$

In Equation 6, if the probability of arranging the public key between two sensor nodes 10 is denoted by "p", and the number of sensor nodes 10 is denoted by "n", the expected degree "d" of the graph can be represented by the above-mentioned equation 6.

As can be seen from FIG. 7, provided that the network size is set to "n" and a variety of $P_c$ values are used, the expected degree "d" of the sensor nodes 10 is depicted. The graph of FIG. 7 shows that the expected degree of the sensor nodes must be doubled to increase the probability of the random graph connectivity. In addition, the higher the value of "n", the lower the slope of the graph of FIG. 7. As a result, it can be recognized that the network size does not affect the sensor-node 10's expected degree required for the connected graph.

In order to provide arrangement density of the sensor network, it is assumed that an expected degree of a neighboring sensor node is set to "N" within a communication range of the sensor node 10. The local connectivity $P_{required}$ required by the expected degree calculated by Equation 6 can be calculated by the following equation 7:

$$P_{required} = \frac{d}{n} = \frac{(n-1)(\ln(n) - \ln(-\ln(P_c)))}{nN} \quad \text{[Equation 7]}$$

After calculating the above-mentioned local connectivity, the S value indicating the key-pool size, and the k value indicating the number of keys of each sensor node 10 are determined. Actual local connectivity is determined by the S and k values, and the S value is not directly associated with the sensor network. However, the k value relates to a memory size of the sensor node 10. Therefore, there is a need for the k value to have a minimum value, if possible. In order to indicate the actual local connectivity, the present invention uses the value of actual $P_{actual}$. The $P_{actual}$ value indicates the probability of searching for a common private key between two sensor nodes 10 adjacent to each other.

Link availability between two pre-existing sensor nodes 10 can be represented by the following equation 8:

$$1 - \text{Prob[a pair of nodes do not share a key]} \quad \text{[Equation 8]}$$

Therefore, the probability $P_{actual}$ of a common private key existing at a pair of two sensor nodes A and B can be calculated by the following equation 9:

$$P_{actual} = 1 - \frac{{}_sC_k \times {}_{s-k}C_k}{({}_sC_k)^2} = 1 - \frac{((S-k)!)^2}{S!(S-2k)!} \quad \text{[Equation 9]}$$

If the S value is very high, the Stirling's theorem is applied to the value of "n!" as denoted by the following equation 10:

$$n! = \sqrt{2\pi n}\left[\frac{n}{e}\right]^n \quad \text{[Equation 10]}$$

In order to simplify the above-mentioned expression of the $P_{actual}$ value, Equation 10 is substituted into Equation 9, such that the following equation 11 is acquired.

$$P_{actual} = 1 - \frac{(P-k)^{2P-2k+1}}{(P-2k)^{P-2k+\frac{1}{2}}} \quad \text{[Equation 11]}$$

Referring to FIG. 8, if the key-pool size "S" is "1000", "2000", "5000", and "10000", and the magnitude of key is in the range from "2" to "200", the graph of FIG. 8 shows the comparison result between the actual local connectivity of the present invention and the actual local connectivity of the conventional art.

As can be seen from FIG. 8, according to the conventional art, the higher the number of keys of the sensor node 10, the higher the local connectivity. However, according to the present invention, the graph is always connected irrespective of the number of keys of the sensor node 10.

The current sensor network can be applied to a variety of technical fields, for example, a temperature-detection field, a humidity-detection field, a light-detection field, and a moving object—detection field, etc. Therefore, the above-mentioned sensor network can also be applied to other technical fields, for example, a housing-management field (such as gas, temperature, or humidity) of a home network, a logistics field, a distribution field, and other services.

However, although the above-mentioned services are made available, the guarantee of security of the moving information of the sensors is not critical to the network environment. Therefore, the present invention provides a method for protecting the moving data of the sensors at a low power and a small amount of resources, such that a safer- and easier-Ubiquitous Computing environment will be implemented.

With the increasing development of the sensor network technology in the light of cost, size, and performance of the chip, the sensor network technology and associated products are being introduced to the market, such that the above-mentioned sensor network technology will be intensively researched and developed.

The higher the development level of the sensor network technology, the smaller the size of the sensor. The higher the development level of the sensor network technology, the higher the intelligence of the sensor. Recently, the production cost of the sensor is being gradually reduced due to the development of the sensor network technology. Therefore, the number of application fields of the above-mentioned sensor network technology will be increased more and more, for example, a home network field, a logistics field, a distribution and environmental field, a disaster prevention field, a medical management field, and a food management field, etc.

With the increasing development of the wireless network equipment, the above-mentioned sensor network technology is being widely used for a variety of wireless network systems, for example, a mobile electronic commercial transaction system and a Location Based Service (LBS). Also, the above-mentioned sensor network technology provides users with a variety of services, for example, a mobile banking service and a mobile stock exchange service, etc. Due to the rapidly-increasing mobile-service users, it is expected that a large number of enterprises will be established.

As apparent from the above description, the method for effectively pre-distributing keys for a distributed sensor network according to the present invention can always search for a common private key between sensor nodes using keys distributed to all the sensor nodes using the LU decomposition method of the symmetric matrix.

The method for effectively pre-distributing keys for a distributed sensor network according to the present invention can increase security using mutual authentication between the sensor nodes.

The method for effectively pre-distributing keys for a distributed sensor network according to the present invention can guarantee connectivity although keys smaller than those of the conventional art are applied to individual sensor nodes. Specifically, provided that the memory of each sensor node is made small, it can be easily recognized that the present invention is superior to the conventional art.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A computer-implemented system for effectively pre-distributing keys for a distributed sensor network including: a plurality of sensor nodes, each of which has a sensing function, a calculation function, and a wireless communication function; and a base station which is connected to the sensor nodes over a wireless network, receives data from the sensor nodes, acts as a data central station, and distributes keys for inter-sensor node security authentication to the sensor nodes, the system comprising:
   a memory and a computer processor,
   a key management unit including a key pool generator contained in the base station, for generating a key pool composed of a symmetric matrix indicating a set of keys used for security authentication between the sensor nodes;
a key decomposition unit for decomposing the key pool generated by the key pool generator into a row of an L matrix and a column of a U matrix using an LU decomposition method; and
   a key distribution unit for receiving the row of the L matrix and the column of the U matrix from the key decomposition unit, and distributing the received row and column to the sensor nodes,
   wherein the key management unit supports that a common private key is searched for by multiplying a row of each sensor node by a column of the sensor node, after columns distributed to two sensor nodes which desire to communicate with each other are exchanged with each other.

2. The system according to claim 1, wherein:
   a first sensor node from among the two sensor nodes has a first common private key ($K_{ij}$) denoted by "$K_{ij}=L_{r\_i} \times U_{c\_j}$", and
   a second sensor node from among the two sensor nodes has a second common private key ($K_{ji}$) denoted by "$K_{ji}=L_{r\_j} \times U_{c\_i}$", wherein
   "$L_{r\_i}$" is indicative of a row assigned to the first sensor node, "$U_{c\_j}$" is indicative of a column assigned to the second sensor node, "$L_{r\_j}$" is indicative of a row assigned to the second sensor node, "$U_{c\_i}$" is indicative of a column assigned to the second sensor node.

3. The system according to claim 1, wherein the key management unit further includes:
   a controller which controls the key pool generator for generating the key pool, the key decomposition unit for key decomposition, and the key distribution unit for key distribution, and controls overall operations of inner devices of the base station.

4. A computer-implemented method for effectively pre-distributing keys for a distributed sensor network including: a plurality of sensor nodes, each of which has a sensing function, a calculation function, and a wireless communication function; and a base station which is connected to the sensor nodes over a wireless network, receives data from the sensor nodes, acts as a data central station, and has a key management unit for generating keys for inter-sensor node security authentication and distributing the generated keys to the sensor nodes, the method comprising:
   a) generating, by the key management unit, a key pool (i.e., the Pool of Keys) indicating the set of the keys;
   b) constructing, by the key management unit, the generated key pool in the form of a symmetric matrix
   c) decomposing, by the key management unit, the symmetric matrix constructed in the step (b) into an L matrix and an U matrix using an LU decomposition method; and
   d) receiving, by the key management unit, a row of the L matrix and a column of the U matrix decomposed in the step (c), and distributing the row of the L matrix and the column of the U matrix to the sensor nodes,
      whereby a common private key required for security authentication is searched for by multiplying a row of each sensor node by a column of the sensor node, after columns distributed to two sensor nodes which desire to communicate with each other are exchanged with each other and
      whereby the steps a)-d) are accomplished by a computer processor.

5. The method according to claim 4, wherein:
   a first sensor node from among the two sensor nodes has a first common private key ($K_{ij}$) denoted by "$K_{ij}=L_{r\_i} \times U_{c\_j}$", and
   a second sensor node from among the two sensor nodes has a second common private key ($K_{ji}$) denoted by "$K_{ji}=L_{r\_j} \times U_{c\_i}$", wherein
   "$L_{r\_i}$" is indicative of a row assigned to the first sensor node, "$U_{c\_j}$" is indicative of a column assigned to the second sensor node, "$L_{r\_j}$" is indicative of a row assigned to the second sensor node, "$U_{c\_i}$" is indicative of a column assigned to the second sensor node.

6. A non-transitory computer-readable recording medium for use in a method for effectively pre-distributing keys for a distributed sensor network including: a plurality of sensor nodes, each of which has a sensing function, a calculation function, and a wireless communication function; and a base station which is connected to the sensor nodes over a wireless network, receives data from the sensor nodes, acts as a data central station, and has a key management unit for generating keys for inter-sensornode security authentication and distributing the generated keys to the sensor nodes, the computer-readable recording medium comprising:

a) generating, by the key management unit, a key pool indicating the set of the keys;
b) constructing, by the key management unit, the generated key pool in the form of a symmetric matrix;
c) decomposing, by the key management unit, the symmetric matrix into several matrices; and
d) receiving, by the key management unit, rows and columns from the matrices, and distributing the received rows and columns to the sensor nodes, whereby a common private key required for the security authentication is searched for by the rows and columns received from the sensor nodes.

* * * * *